US006889416B2

(12) United States Patent
McGlinchy

(10) Patent No.: US 6,889,416 B2
(45) Date of Patent: May 10, 2005

(54) PROCESS FOR MAKING LAMINATING PREFORMED MUNTIN BARS

(75) Inventor: Timothy Bryan McGlinchy, Twinsburg, OH (US)

(73) Assignee: Glass Equipment Development, Inc., Twinsburg, OH (US)

( * ) Notice: Subject to any disclaimer, the term of this patent is extended or adjusted under 35 U.S.C. 154(b) by 0 days.

(21) Appl. No.: 10/754,386

(22) Filed: Jan. 9, 2004

(65) Prior Publication Data

US 2004/0139592 A1 Jul. 22, 2004

Related U.S. Application Data

(60) Division of application No. 10/133,718, filed on Apr. 26, 2002, now Pat. No. 6,745,460, which is a continuation-in-part of application No. 09/781,630, filed on Feb. 12, 2001, now Pat. No. 6,687,982.

(51) Int. Cl.[7] .......................... B21D 35/00; B23P 21/00
(52) U.S. Cl. ........................................ 29/469.5; 29/469
(58) Field of Search .................... 29/469, 690, 560, 29/563, 564, 700, 791, 792; 156/212, 216; 52/204.61, 660, 664, 745.19

(56) References Cited

U.S. PATENT DOCUMENTS

| | | | |
|---|---|---|---|
| 3,434,901 A | * | 3/1969 | Griffiths et al. ............. 156/210 |
| 4,381,726 A | | 5/1983 | Hojberg |
| 4,530,195 A | | 7/1985 | Leopold |
| 4,546,723 A | | 10/1985 | Leopold et al. |
| 4,628,582 A | | 12/1986 | Leopold |
| 5,088,307 A | | 2/1992 | Cole |
| 5,105,591 A | | 4/1992 | Leopold |
| 5,165,208 A | | 11/1992 | Lingemann |
| 5,295,292 A | | 3/1994 | Leopold |
| 5,313,761 A | | 5/1994 | Leopold |
| 5,361,476 A | | 11/1994 | Leopold |
| 5,678,377 A | | 10/1997 | Leopold |
| 5,862,584 A | * | 1/1999 | Manser ........................ 29/560 |
| 6,173,484 B1 | | 1/2001 | McGlinchy et al. |
| 6,244,012 B1 | | 6/2001 | McGlinchy et al. |

* cited by examiner

*Primary Examiner*—John C. Hong
(74) *Attorney, Agent, or Firm*—Watts Hoffman Co., LPA

(57) ABSTRACT

An exemplary embodiment of the invention concerns a process for forming two tone muntin bars. Method and apparatus of the invention uses an elongated preformed muntin bar member that has a treated portion of an exposed surface of the muntin bar member. An elongated strip of covering material is provided for controlled application onto a specified portion of the treated portion of the muntin bar material. The elongated strip of covering material includes an adhesive that causes the covering material to adhere to the muntin bar member. The muntin bar member and the covering material are brought into contact with each other to cause the covering material to overlie and adhere to the muntin bar member.

14 Claims, 5 Drawing Sheets

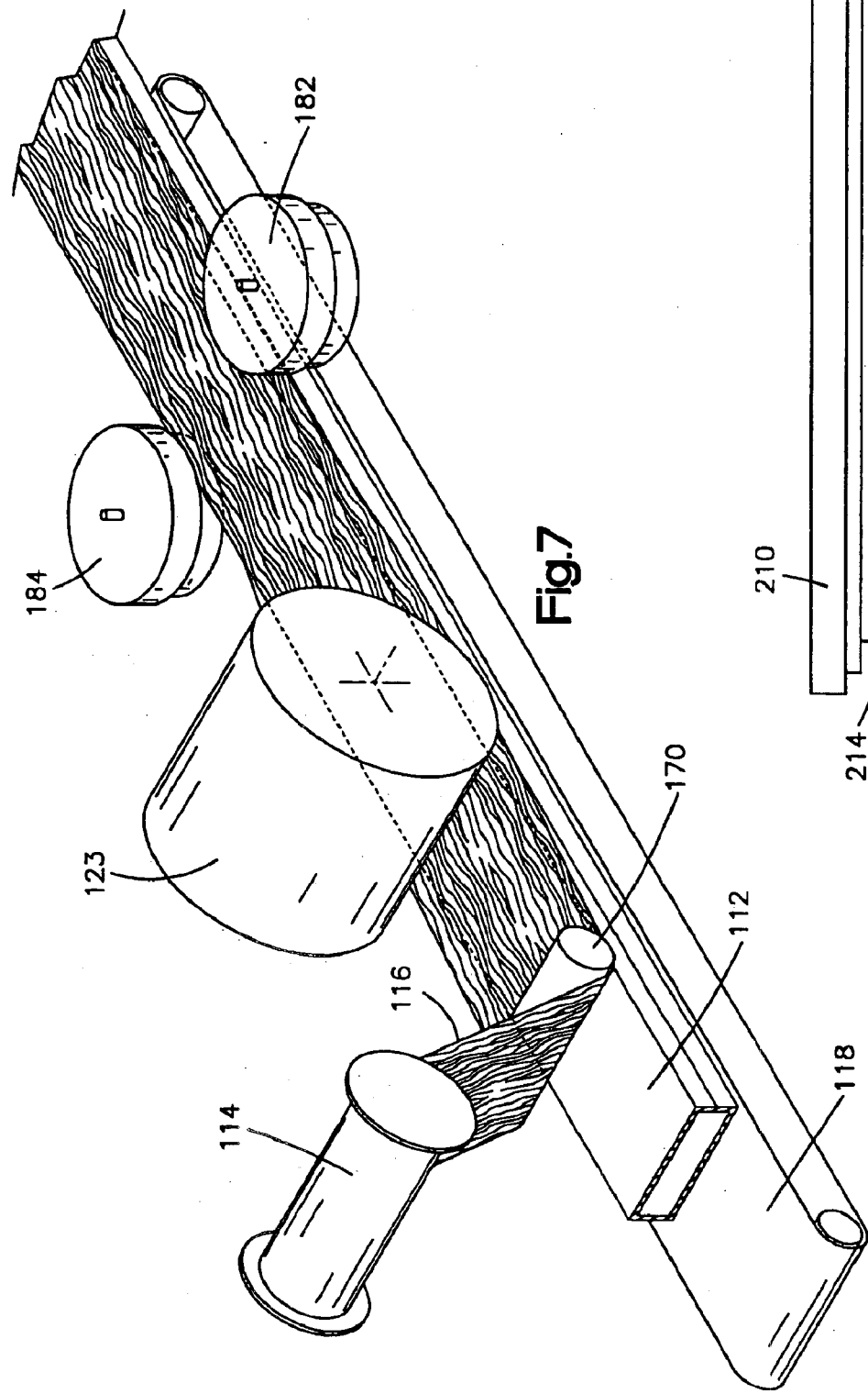
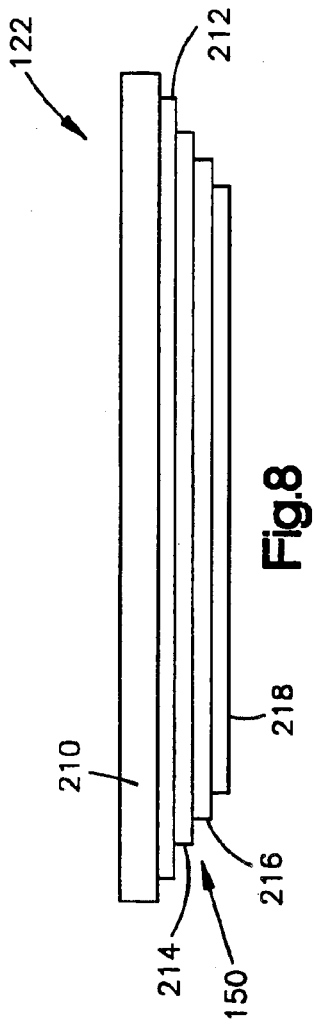
Fig.7
Fig.8

PROCESS FOR MAKING LAMINATING PREFORMED MUNTIN BARS

CROSS REFERENCE TO RELATED APPLICATIONS

This is a Divisional application of application Ser. No. 10/133,718, filed on Apr. 26, 2002 now U.S. Pat. No. 6,745,460 which is a continuation in part of application Ser. No. 09/781,630, entitled "Laminated Muntin Bar Method and Apparatus" to McGlinchy and which was filed in the United States Patent and Trademark Office on Feb. 12, 2001 now U.S. Pat. No. 6,687,982.

FIELD OF THE INVENTION

The present invention concerns muntin bars used for separating window panes of large size into smaller size panes to enhance the appearance of a window.

BACKGROUND ART

Windows constructed from multiple glass panes utilized "muntins" or "muntin bars" to secure the edges of the individual glass panes within the window sash. In many windows, muntins formed distinctive grid patterns that are associated with architectural styles of buildings containing the windows.

Modern windows formed by insulating glass units utilize single glass fights separated by an insulating dead air space. Where a particular architectural "look" is desired, a grid of muntin bars is fixed in the dead air space between the glass lights to simulate a multi-pane window. Typical muntin bars for insulating glass units are formed from decoratively coated intermitted metal tubes. The grids are anchored to the insulating glass unit periphery.

Constructing muntin bar grids for insulating glass units has been a labor intensive process. As a consequence, manufacturing such units, and thus windows formed by the units, has been costly and inefficient. Some efforts to automate the manufacture of muntin grids have been made. Commonly owned U.S. Pat. No. 6,173,484 entitled "System for Fabricating Muntin Bars from Sheet Material" which issued Jan. 16, 2001 to McGlinchy et al. is an example of a system for automated fabrication of muntin bars. The subject matter of the '484 patent is incorporated herein by reference. Commonly owned pending U.S. patent application Ser. No. 09/525,349 entitled "System for Fabricating Contour Muntin Bars from Sheet Material" is a second patent application to McGlinchy et al concerning automated fabrication of so-called contour muntin bars and the subject matter of this application is incorporated herein by reference.

The muntin bar stock is produced by roll forming decoratively coated sheet material such as aluminum or steel, in a known manner. Various sizes of the sheet material are used to form different size muntin bar stock. The roll forming machine has a series of rolls configured to form the sheet material into elongated tubular muntin bar stock. A window manufacturer purchases the muntin bar stock size(s) needed to produce insulating glass units. Apparatus disclosed in the aforementioned patent application also cuts the stock into lengths that are notched in appropriate locations for assembly into grids for incorporation into the insulating glass units.

The residential window and door industry has witnessed an increase in demand for decorative muntin bars contained inside insulated glass (IG) units of windows. The demand for muntin bars has increased due to popular "colonial look" trends in the market which has increased the demand for muntin bars. Also contributing to the demand are new construction and residential building codes requiring a common facade in local neighborhoods. With people also desiring differentiation and designer choices in their windows, a demand for so-called "two tone" muntin bars is also on the rise. The two tone muntin bar presents one appearance from the outside and a second appearance from-inside the window.

Two-tone muntin bars are offered today in many color combinations for both rectangular and contour style muntin bars. A two-tone muntin bar demands a premium price in the market place. One reason for the increased price of two tone muntin bars is the fact that automated manufacturing of two tone muntin bars using controlled notching, roll forming and severing has not occurred.

The most common method practiced at the present time for manufacturing two tone muntin grids starts with a long roll formed bar that is often shipped to a secondary supplier that paints or laminates the bar with a solid color tone or pattern on one side and a second color or pattern on the opposite side. Use of multiple steps performed by multiple suppliers results in significant additional cost to the final assembled product. More elaborate bars have simulated wood grains that are used to match up with the wood trim in or surrounding the window sash. All of the current methods require cutting specified length segments from a two tone bar. The bar is then mitred and/or punched to complete fabrication of the muntin bar. The current methods require post painting and/or lamination which are time consuming, costly and provide limited throughput. This requirement also leads to a build up of inventory to give the suppliers adequate lead time for performing these post roll forming procedures.

SUMMARY OF THE INVENTION

The present invention concerns an automated method and apparatus for producing laminated muntin bars. Sheet material is roll formed into either rectangular or contour muntin bars and then covered with laminating material. In accordance with one exemplary process muntin bars are provided that have one appearance when viewed from outside the window and a second appearance when viewed from inside the window.

A process for making muntin bars in accordance with the invention includes providing an elongated preformed muntin bar member that has been treated on a portion of an exposed surface of the muntin bar member. An elongated strip of covering material is provided for controlled application onto a specified portion of the treated portion of the muntin bar material. The elongated strip of covering material includes an adhesive for adhering the covering material to the muntin bar member. The muntin bar member and the covering material are brought into contact with each other while applying heat and pressure to cause the covering material to overlie and adhere to the muntin bar member.

When making two tone muntin bars, one exemplary embodiment of the invention starts with an elongated strip of muntin bar material that has been painted on at least one side. The strip is roll formed to form an elongated generally hollow bar. The painted surface of the elongated bar is then covered with a covering material that is brought into contact with the painted surface to alter an appearance of the muntin bar material. More specifically, the covering material covers one half of an exterior, painted surface of the muntin bar material to form a two tone muntin bar member.

Practice of the invention allows the laminated muntin bars to be produced on an as needed basis. A coil of strip that has been painted and treated with a second color on one half of its surface is then stored in inventory. This inventory is bent by rollforming equipment and then coated with a covering material on an as needed basis. This is to contrasted with a prior art process of fabricating muntin bars which must be shipped to a supplier and secondly shipped back to the window fabricator for inclusion in an IGU. There is a cost savings as well as a savings in time especially where the inventory is maintained at the same location that the muntin bar fabrication occurs.

The disclosed embodiment of the invention uses a flexible elongated multilayer strip or foil of covering material that is applied to a painted surface of preformed muntin bar material. One layer of the flexible elongated multilayer strip or foil has an appearance which is visible on a muntin bar fabricated from the mutlilayer strip. A second, adhesive layer causes the first, appearance defining layer to adhere to a preformed muntin bar memeber. The foil also includes a carrier layer for supporting the first layer as the multilayer strip or foil is brought into contact with the preformed muntin bar member.

These and other objects, advantages and features of the, invention will become better understood from a review of the exemplary embodiment of the invention which is described in conjunction with the accompanying drawings.

BRIEF DESCRIPTION OF THE DRAWINGS

FIG. 7 is a perspective view of the apparatus of FIG. 5 with some components deleted for clarity in illustration;

FIG. 8 is a schematic depiction of a laminated foil used in practicing the present invention.

BEST MODE FOR PRACTICING THE INVENTION

Figure 1:
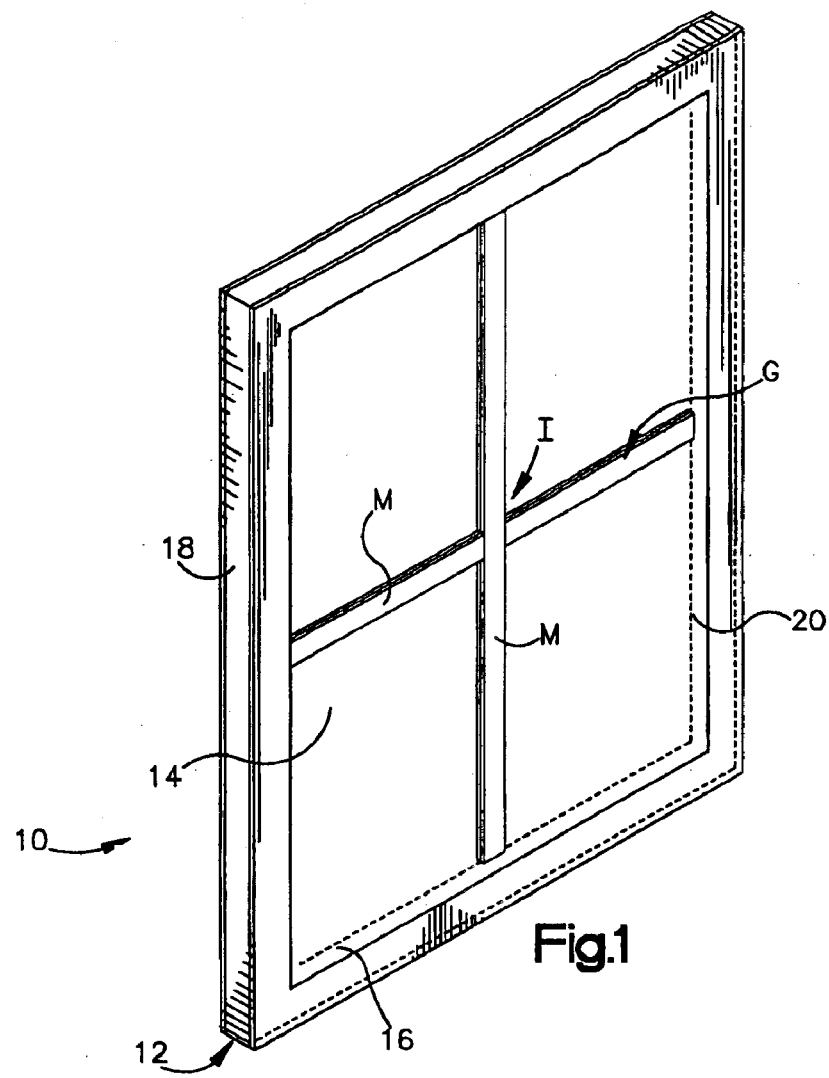
FIG. 1 is a perspective view of an insulating glass unit including a muntin bar grid.

FIG. 1 shows an insulating glass unit indicated generally by the reference numeral 10 comprising a spacer assembly 12 sandwiched between glass sheets, or lights 14. The spacer assembly 12 includes a frame assembly 16 hermetically joined to the glass lights by a sealant 18 to form a closed dead air space 20 between the lights. The unit 10 is illustrated in FIG. 1 is in condition for assembly into a window or door frame (not shown).

Figure 2:
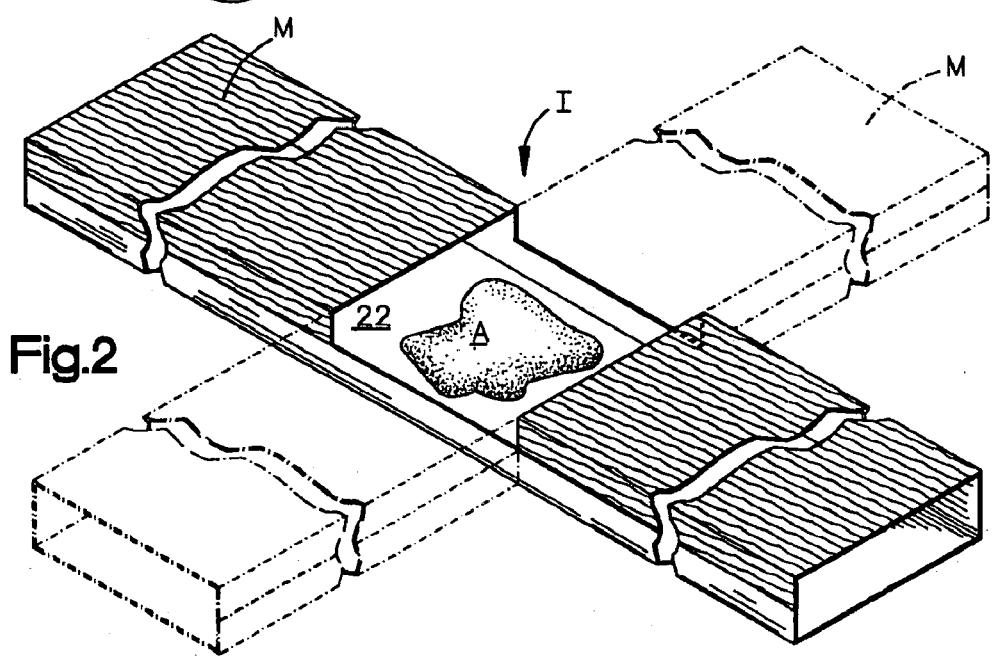
FIG. 2 is an enlarged perspective view of a portion of the muntin bar grid of the insulating glass unit of FIG. 1.

A muntin bar grid indicated at G is disposed between the glass lights to provide the unit 10 with the appearance of a multi-pane window. As seen in FIG. 2, the illustrated grid G is comprised of muntin bars M having mating notches 22 interfitted at an intersection I. In certain instances the bars M are secured together by a suitable adhesive indicated at A, but a more common technique secures together two muntin bars with a flexible cross shaped clip that extends a short distance into each of the two intersecting muntin bars M. The ends of the muntin bars M are secured to the interior of the spacer frame 16 by suitable fasteners as is known in the art.

Figure 3:
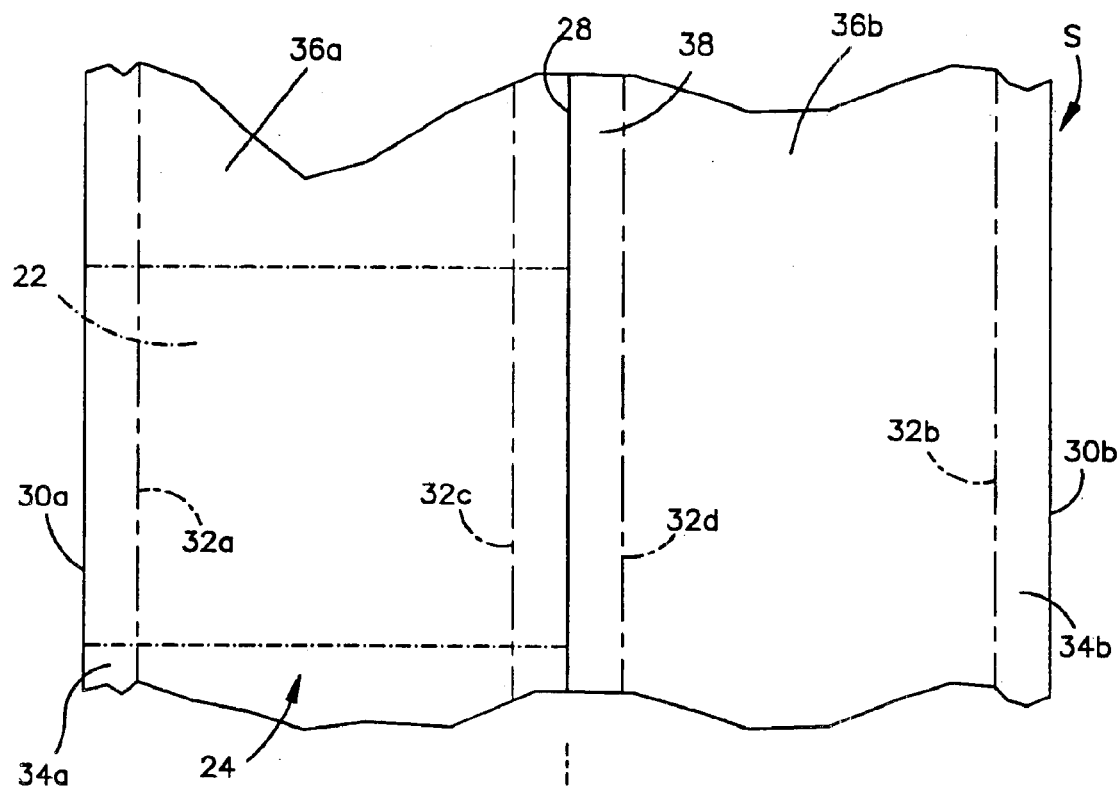
FIG. 3 is a plan view of a portion of stock material partially processed according to the invention.

FIG. 3 shows a length of stock material S that is to be formed into a muntin bar M (FIG. 2). An outer surface 24 of the stock material S is painted to have a desired color. This first color is the color presented to an observer from one side of the completed insulating glass unit 10. The stock material S is made from a thin elongated metal, for example, aluminum or steel that can be wound into an elongated strip as disclosed in the '484 patent and pending patent application to McGlinchy et al. noted above. The two tone appearance of the muntin bar M shown in FIG. 2 is achieved by applying a coating or covering layer 150 (FIG. 8) to one side of the strip. The process for applying this coating or covering layer is described in greater detail below.

According to the fabrication process disclosed in the McGlinchy et al. patent (U.S. Pat. No. 6,173,484), the ribbon stock S is fed from a supply lengthwise through a muntin bar production line including a series of forming stations and is formed into a muntin bar M having a notch 22 for interfitting with the notch of another muntin bar as is depicted in FIG. 2. The stock material S (FIG. 3) includes opposite edges 30a, 30b that, along with two other fold lines 32a, 32b, define a pair of end panels 34a, 34b. The fold lines 32a, 32b, along with fold lines 32c, 32d, define a pair of intermediate panels 36a, 36b. The fold lines 32c, 32d define a central panel 38. The notch 22, shown in phantom, extends inward from edge 30a of the stock material illustrated in FIG. 3 to a strip centerline 28.

Figure 4:
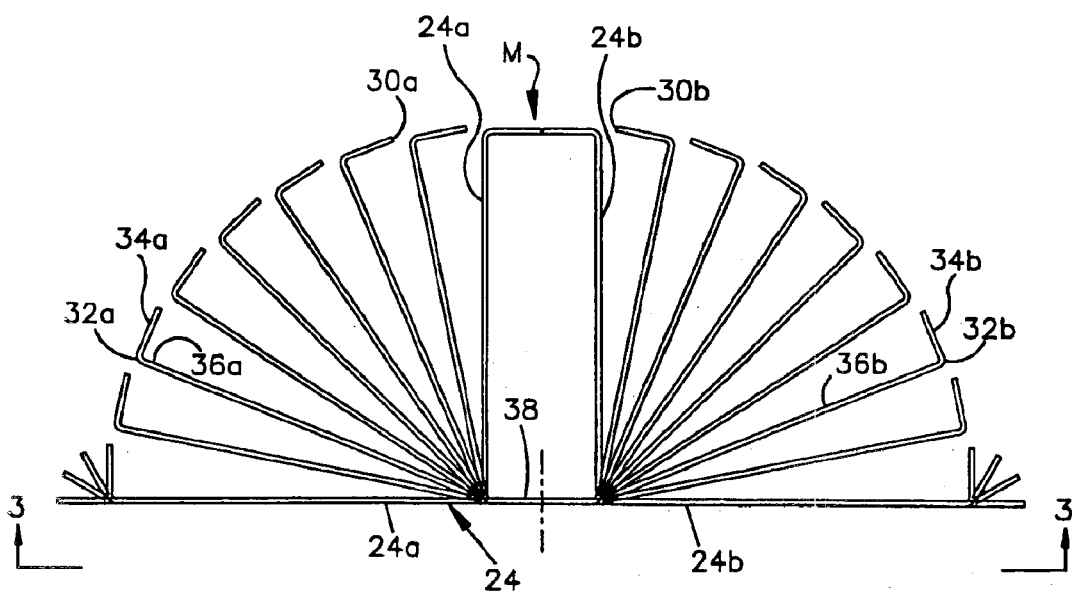
FIG. 4 is an elevation view schematically illustrating forming the stock material of FIG. 3 into a muntin bar.

FIG. 4 schematically indicates a progressive change in the shape of the strip S from a flat strip to a rectangular cross section structure as the strip passes through a multiple stage roll forming apparatus (not shown). The strip S is bent in the region of the fold lines 32a, 32b, 32c, 32d to form an enclosed structure having rectangular borders as seen from the end. When severed from the end of the strip S this structure forms a muntin bar M that is interfitted with one or more other bars to form a grid G such as the grid of FIG. 1.

As can be seen in FIG. 4, once the muntin bar M has been bent to its closed rectangular configuration it defines an outer surface visible from both inside and outside the IG unit 10 when incorporated into a muntin bar grid. The outer surface includes a first outwardly facing half portion 24a that would be visible to a person looking through the IG unit 10 from one side of the unit 10 and a second outwardly facing half portion 24b that would be visible to a person looking through the IG unit 10 from the opposite side of the unit. In accordance with the present invention, a layer of material that defines an appearance of one side of the outer surface of a muntin bar is applied to the muntin bar after the muntin bar has been bent into the closed form configuration depicted in FIG. 4 and cut to an appropriate length.

Figure 5:
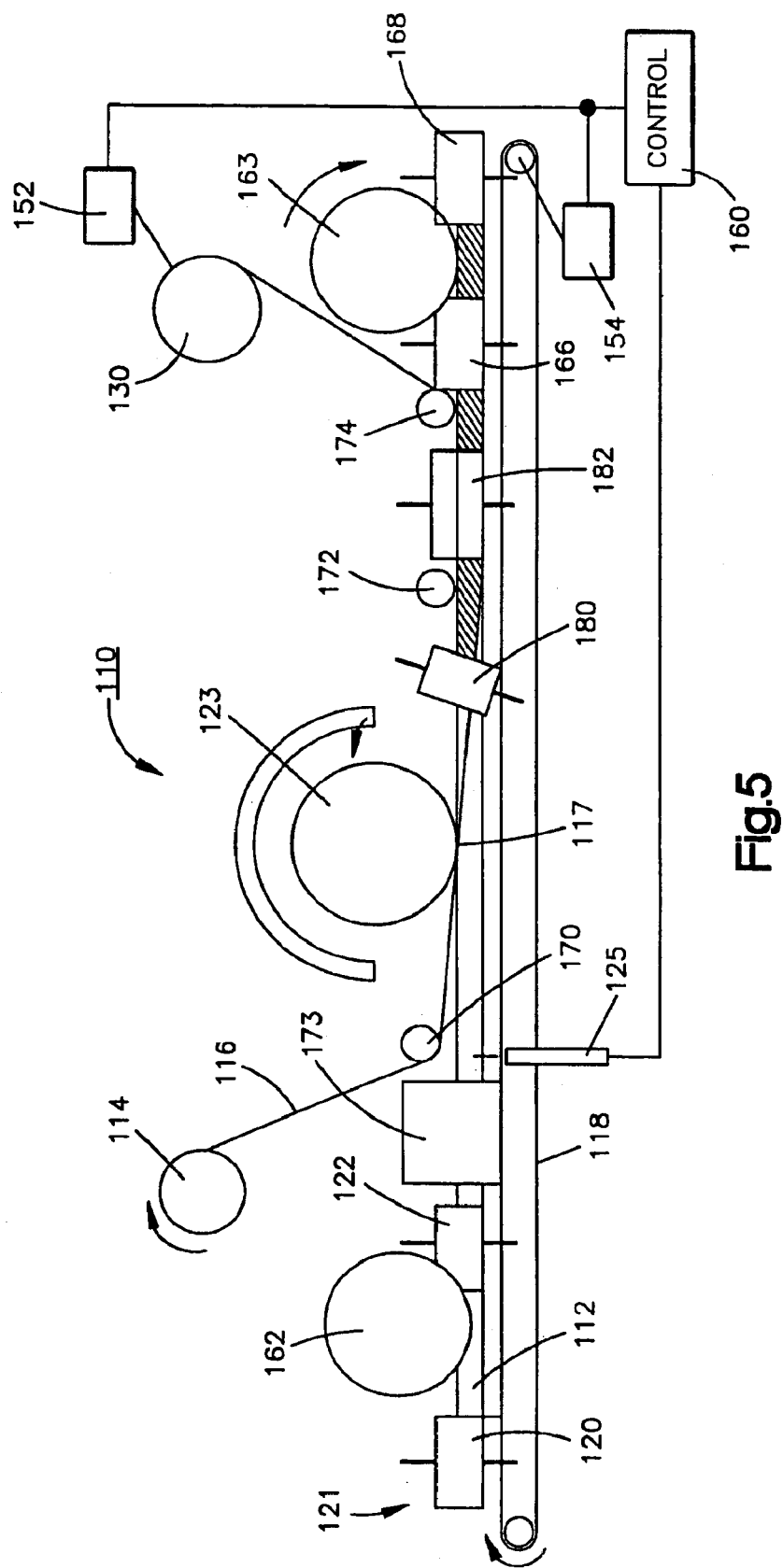
FIG. 5 is a schematic depiction of apparatus for applying covering material to muntin bar members.

FIG. 5 illustrates a system 110 for fabricating two tone muntin bars M such as the bars depicted in FIG. 2. Apparatus depicted in FIG. 5 covers one half of each of a plurality of preformed muntin bar members 112 with a covering material 150 so that opposite sides of the material have different appearances. A supply 114 that is mounted for rotation unwinds an elongated strip 116 including the covering material from the supply 114. The elongated strip 116 is routed to a region 117 of contact between the muntin bar members 112 and the strip 116. The muntin bar members 112 have been treated on half of the outer surface to enhance adhesion between the muntin bar member 112 and a covering material or a covering layer 150 (FIG. 8) that forms part of the elongated strip 116. In the disclosed embodiment the covering material 150 is applied to a top half of the muntin bar members 112 as the members move along a travel path defined by a conveyor 118.

In the exemplary embodiment of the invention, the muntin bar members 112 are treated by painting an entire outer surface 24 of the muntin bar strip S (FIG. 3) from which the muntin bar members 112 are fabricated. In an exemplary embodiment of the invention, the paint applied to the surface 24 has a thermoplastic polyester base formulated to inhibit offgassing of any volatile contaminants created in the process of fabricating IG units and thus will not fog when high energy infrared ovens are used to fabricate IG units. Suitable paints may be obtained under the tradename "Specialty Super Series 1000" from Specialty Coating Company, Inc. of Elk Grove Village, Ill. 60007. Physical properties of this paint are listed below:

Viscosity @ 77 degrees F. 25–30 SEC
Viscometer: #4 Zahn
Weight/Gallon Range 9.0–9.4 LBS
Coverage 748 SQ.FT/Gal @ 50 mils
Non-Volatile Weight 36–38%
Non-Volatile Volume 22–24%
VOC Range 5.71–5.91 lbs/Gal
HMIS Rating 2-2-0-C Returning to FIG. 5, the elongated strip 116 is brought into contact with a top surface of the muntin bar member 112 as the conveyor 118 moves the muntin bar member 112 along a generally linear travel path. In one embodiment of the invention, an operator places a muntin bar onto a top surface of the conveyor 118 between two guide rollers 120 that form an entrance 121. The conveyor 118 moves the muntin bar member 112 through a second set of guide rollers 122 which in combination with the first set of rollers maintain side to side registration of the muntin bar member 112. The muntin bar member 112 contacts the strip 116 downstream from the rollers 122.

The strip 116 includes a coating or covering material 150 that is applied onto a desired portion of the painted strip surface, i.e., one of the outwardly facing surfaces 24a or 24b of the painted outer surface of a cut to length muntin bar member 112. Application of the covering material 150 onto a desired portion of the painted muntin bar member 112 is accomplished using controlled application of heat and pressure by the roller 123 against the muntin bar member 112 and the strip 116. The heat and pressure applied by the roller causes the covering material 150 to separate from the elongated strip 116 and adhere to the muntin bar member's painted outer surface.

Turning to FIG. 8, the elongated strip 116, sometimes referred to as a hot stamp lamination foil, comprises a carrier layer 210, typically a polyester film, which provides a backing or substrate for the strip 116. A release layer 212 is adhered to the carrier layer 210 and, in turn, the covering material 150 is adhered to the release layer 212. The release layer 212 preferably is a lacquered resin with a low melting point. During the lamination or application process, when the strip 116 is sufficiently heated the release layer 212 melts thereby releasing or separating the covering material 150 from the carrier layer 210. Pressure applied causes the covering material 150 to be adhesively affixed to the painted outer surface of the muntin bar member 112.

In one exemplary embodiment, the covering material 150 is comprised of three layers: a decorative color or printed layer 216, a protective layer 214 and an adhesive layer 218. The protective layer 214 is optional, but depending on its composition, can protect the decorative color layer 216 from scratching, chemical attack and UV (ultra violet) fading.

The decorative color layer 216 may be a desired paint color or a printed image, e.g., a wood grain finish appearance. The decorative color layer 216 is typically an ink lacquer which dries very rapidly by release of solvent. After application of the covering material 150 to the painted muntin bar member's outer surface (24a or 24b), the protective layer 214 functions as an outer protective surface for the decorative color layer 216 to protect the color layer 216 from scratching, resists chemicals and reflects UV radiation.

The third component of the covering material 150 of the strip 116 is the adhesive layer 218. The adhesive layer 218 comprises an adhesive that is formulated for compatibility with the paint applied to the muntin bar member's outer surface as well as the decorative color layer 214. The adhesive layer 218 is typically comprised of a combination of resins (lacquers) that cure from applied heat and chemically cross link the decorative color layer 216 to the paint applied to the muntin bar member's outer surface 24.

Figure 9:
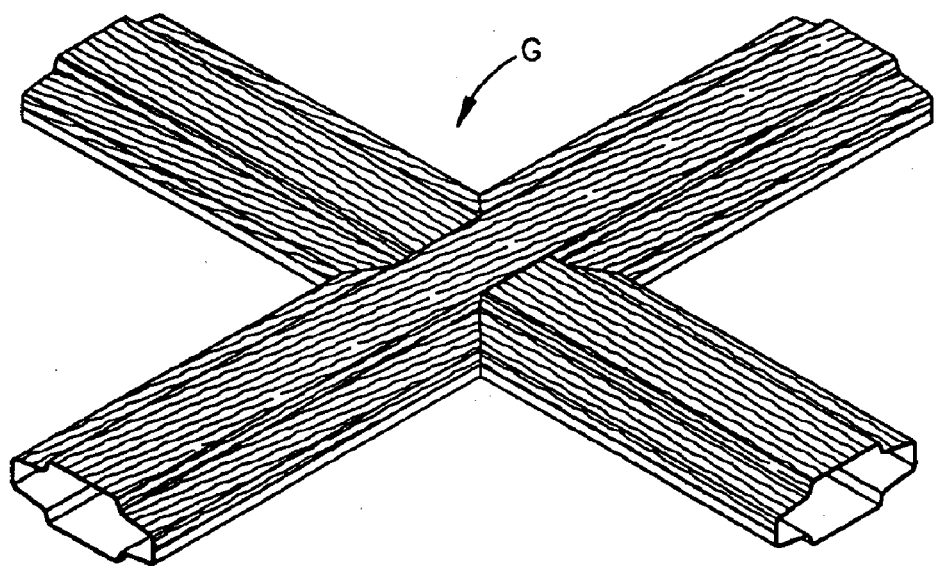
FIG. 9 is a perspective view of a contour muntin bar grid having muntin bars that has been coated on one side with a coating.

Roll forming of the muntin bar member 112 prior to coating provides either a rectangular cross section shaped muntin bars M as disclosed in FIG. 2 and shown schematically in FIG. 4 or in a contour muntin bar for forming a muntin bar grid G as depicted in FIG. 9.

Referring again to FIG. 5, movement of the muntin bar members 112 and the strip 116 is co-ordinated by a drive system (discussed below) for simultaneously unwinding the strip 116 and actuating the conveyor 118 to bring the bars and strip into contact with each other at the same speed. Once the covering material 150 separates from the strip 116 and adheres to an associated muntin bar 112, the carrier layer 210 is rewound onto a recoiler 130. In the disclosed exemplary embodiment of the invention the covering material 150 covers one half of the outwardly facing surface of each of the preformed muntin bars that are delivered to the transfer region by the conveyor, namely one of the surface portions 24a or 24b.

Referring to FIGS. 5 and 7, the pressure roll 123 applies pressure to a region of engagement between the muntin bar members 112 and the strip 116. In the exemplary embodiment of the invention the pressure roll is mounted for up and down movement so that in a down position the roll 123 applies heat and pressure to a muntin bar member. A sensor 125 which, in the exemplary embodiment of the invention, is an optical sensor, senses when radiation emitted by the sensor 125 is reflected by the muntin bar members 112 as they pass by the sensor 125. Each time the sensor 125 senses the arrival of a leading edge of a next subsequent muntin bar member delivered by the conveyor 118 a controller 160 actuates a drive (not shown) which moves the roll 123 to contact that muntin bar member 112.

The covering material 150 of the strip 116 is transferred onto the painted surface of the muntin bar 112 using heat and pressure. During the lamination process, the release layer 212 is melted and the carrier layer 210 separates from the covering material layer 150 that adheres to the muntin bar. This leaves the layers 214, 216, 218 that make up the covering layer 150 on a top one half portion of the outside surface of the muntin bar member 112.

The recoiler 130 and the conveyor 118 are driven by respective motors 152, 154 having output shafts coupled to the recoiler and the conveyor whose speed of rotation is coordinated by the controller 160 which in an exemplary embodiment of the invention is a programmable controller executing a stored program. The controller 160 co-ordinates the speed of rotation of the two motors 152, 154 to a desired speed setpoint. Two idle rollers 162, 163 are mounted above the muntin bar members 112 so that they contact a top surface of the muntin bar members and help hold the bar members in position as the conveyor moves the muntin bar members along a path of travel through the region where they are contacted by the heated pressure roll 123.

Side to side alignment or registration of the muntin bar member 112 is maintained by the entrance guide rollers 120, 122 and pairs of exit guide rollers 166, 168 that engage the side of the muntin bar member 112 downstream from the pressure roll 123. The guide rollers 120, 122, 166, 168 rotate about generally vertical axes and maintain the muntin bar member in side to side alignment in the region 117 the strip 116 comes into contact with the bar 112 and is heat and pressure treated by the pressure roll 123. These guide rollers are idle rollers and rotate as the muntin bar members 112 are conveyed along a travel path by the conveyor 118.

The strip 116 is unwound from its supply 114 and reeved around a guide roller 170. The strip 116 then contacts the bar member 112 at the region 117 of the pressure roll. The muntin bar member 112 and pressure roll 123 define a nip which exerts a pressure against the strip 116. Proper application of heat and pressure causes the carrier layer and the covering material to separate from each other. On the exit side of the pressure roll 123 the carrier layer 210 passes under two guide wheels 172, 174 and is then wound onto the recoiler 130.

The pressure roll 123 is a heat controlled iron impregnated silicone roller. Before reaching the roller 123, the muntin bar member 112 passes through a controlled preheat chamber 173 to preheat the muntin bar member 112. Preheating the muntin bar member 112 facilities proper adhesion of the adhesive layer 150 to the painted top surface of the muntin bar member to produce high quality lamination at high speeds (greater than 10 feet per minute). The heating cross links bonding between the decorative paint layer 154 and the painted strip surface 24.

Experience with the lamination process has identified ranges of operating parameters for use in practicing the invention. It has been found that the preheat chamber 172 should raise the temperature of the muntin bar member 112 to approximately 200 degrees F. at an exit from the chamber 172. Performance has been seen to be adequate when the temperature is within a range of 190 degrees to 210 degrees. At the contact region 117 the temperature of the pressure roll 123 has been adequate when maintained at about 400 degrees F. Throughputs of between ten and fifty feet per minute have been achieved through practice of the invention and even higher throughputs may be achievable.

In accordance with the exemplary embodiment of the invention the strip 116 has a width that completely covers a top surface of the muntin bar member 112 and hangs over the side on each of the two sides of the member 112 a distance to cover one half of each side wall of the muntin bar member. Turning to FIG. 3, the strip 116 would have a width equal to one half the entire width of the strip S from which the preformed muntin bar member 112 is formed. Other widths for the strip 116 could be used depending on the application. In an embodiment in which the strip 116 covers the top half surface of the muntin bar member 112, as that top surface (36a, or 36b) is covered portions of the strip 116 overhang the sides of the bar member 112.

Figure 6:
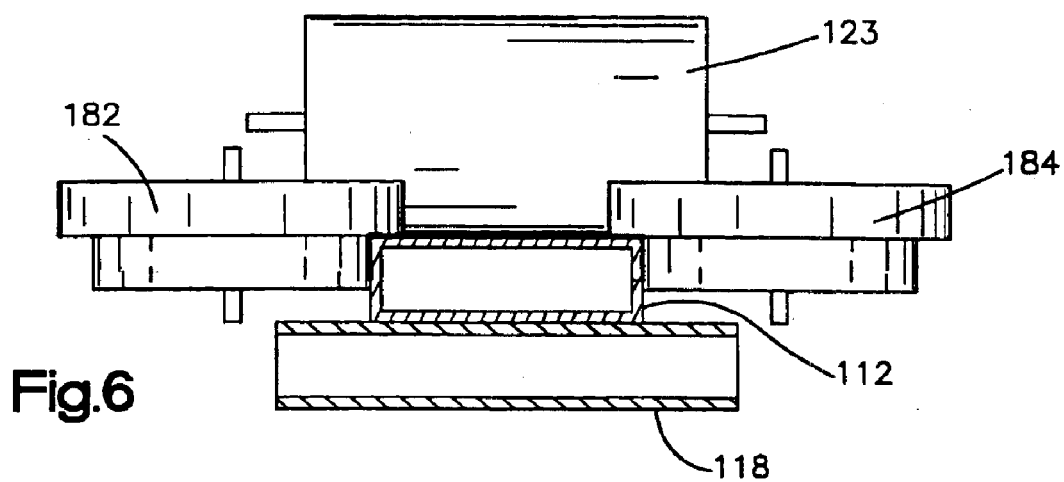
FIG. 6 is a schematic depiction illustrating muntin bar members being fed through a station where an overhanging portion of a laminating covering is heat and pressure treated to adhere to one side of a muntin bar member.

Referring to FIG. 5, downstream from the pressure roll 123 outer surfaces of the overhanging parts of the strip 116 are engaged by an angled roller 180 that is rotatably mounted next to the conveyor 118. Contact with the roller 180 folds the overhanging portions of the strip 116, causing those portions to come into contact with the side walls of the muntin bar member. Downstream from the angled roller 180, the muntin bar member 112 passes through two side heated pressure rolls 182, 184 (FIGS. 6 and 7). These rolls 182, 184 have stepped outer surfaces. A larger diameter part of each roll overlies a portion of the top of the muntin bar member 112 and a second reduced diameter portion of the roll engages the side wall of the muntin bar member to apply pressure to the overlapping portion of the strip 116. These two rolls 182, 184 are also heated so that the combination of pressure and heat applied to the strip 116 causes the covering layer 150 of the overhang portion of the strip 116 to separate from the carrier layer and become securely adhered to the side walls of the muntin bar members as they move through the rolls 182, 184.

The exemplary embodiment of the invention has been described as treating rectangular muntin bars. In this exemplary embodiment, the notches 22 needed to fabricate a grid of intersecting muntin bars are formed (using prior art notch forming equipment) after the grids are laminated with the covering layer. It is believed that pre-notching of the muntin bar members using the equipment disclosed in the '484 patent to McGlinchy et al is would also work. At the notched region of the muntin bar, the covering layer 150 does not separate from the carrier layer 210 because pressure is not applied to the release layer 212 in the notch region of the muntin bar. The release layer holds the backing layer 210 to the covering layer 150 in the notched region. The covering layer in the notched region separates from the portion of the covering layer that adheres to the muntin bar.

FIG. 9 shows a contour muntin bar grid wherein the components of the grid G are constructed from contour muntin bars that are preformed and inserted into a system similar to that depicted in FIG. 5. In this system, the guide rolls and pressure applying rolls are configured to engage outer surfaces of the contour muntin bars shown in FIG. 9.

Certain applications require both sides of a muntin bar grid to have the same appearance but an appearance not obtained by merely painting the strip from which the muntin bars are constructed. For such applications, it is possible that the system 110 shown in FIG. 5 could be used to first coat one side of the muntin bar member and then the now partially covered muntin bar member would be turned over and passed through the system 110 again so that both sides of the muntin bar member is covered with the same covering. Notching of the muntin bars for such a system would be performed after the muntin bar members are coated using prior art notching equipment. Alternatively, pre-notching could be used and as noted above the coating material could be applied in such a way that the coating layer 150 would remain affixed to the carrier layer 210 in the region of the notches. As described there are gaps between muntin bar members as they pass along the conveyor 118. In the region of these gaps the coating layer 150 remains adherred to the backing 210 since the roller 123 cannot apply pressure to the release layer 212, because the roller 123 does not bring the strip 116 into contact with an opposing surface.

While the present invention has been described with a degree of particularity, it is the intent that the invention include all modifications and alterations from the disclosed design falling within the spirit or scope of the appended claims.

What is claimed is:

1. A process for making muntin bars comprising the steps of:
   a) providing an elongated preformed muntin bar member having an exposed surface having a treated portion;
   b) providing an elongated strip of covering material for controlled application onto a specified portion of the treated portion of the muntin bar member, said elongated strip of covering material including an adhesive for adhering the covering material to the muntin bar member, and
   c) bringing the muntin bar member and the covering material into contact with each other to cause the covering material to overlie and adhere to the muntin bar member.

2. The process for making muntin bars of claim 1 wherein the muntin bar member is precut to a length chosen for use in a muntin bar grid before the covering material is applied to said muntin bar member.

3. The process for making muntin bars of claim 2 wherein the muntin bar member includes a notch that defines an intersection region with another muntin bar member which is cut into the muntin bar member before the covering material is applied to said muntin bar member.

4. The process of claim 1 additionally comprising applying a coating to muntin bar material by painting an elongated strip of muntin bar stock material, roll forming said strip to form a preformed generally hollow muntin bar member and bringing the covering material into contact with a painted portion of the muntin bar material.

5. The process of claim 4 wherein one entire side of the elongated muntin bar member is painted to provide a painted surface and wherein one half of said painted surface is covered with the elongated strip of covering material to form a muntin bar member.

6. The process of claim 4 wherein an outer surface of a strip of material is painted prior to being bent into a generally hollow muntin bar member and wherein both sides of the bar member are covered with a covering layer by the step of passing the muntin bar member along a coating travel path to cover one side of the muntin bar member and then passing the muntin bar member along said coating travel path to cover a second aide of the muntin bar member.

7. The process of claim 4 wherein a foil is pressure treated along a side surface by side rollers causing the foil to separate from a carrier layer.

8. The process of claim 1 wherein the elongated strip of covering material is a multilayered foil and wherein one layer is an adhesive, a second layer is a plastic film carrier, and a third layer is a release layer and further comprising the step of applying a controlled pressure as the multilayered foil is brought into contact with the muntin bar member to cause the adhesive layer to bond to the muntin bar member.

9. The process of claim 8 additionally including applying heat to a region of contact between the covering material and the muntin bar material.

10. A process for making multiple two tone muntin bars for a muntin bar grid comprising the steps of:
    a) providing a series of elongated muntin bar members that have been cut to a length suitable for inclusion into a muntin bar grid, which has been treated on an outer surface, and feeding the muntin bar members along a travel path;
    b) providing an elongated strip of covering material for controlled application onto a specified portion of the outer surface of the muntin bar member, said elongated strip of covering material including an adhesive for adhering the covering material to the muntin bar member, and
    c) bringing the covering material into contact with the muntin bar members as they move along their travel path to cause the covering material to overlie and adhere to the muntin bar members to farm a series of elongated preformed muntin bars which are subsequently assembled into a muntin bar grid.

11. The process of claim 10 additionally comprising applying a coating to the elongated muntin bar material by painting a piece of elongated muntin bar material, bending the muntin bar material into an elongated muntin bar stock material and cutting the muntin bar grids from the elongated muntin bar stock material.

12. The process of claim 11 wherein the elongated strip of covering material is a multilayered foil and wherein one layer is an adhesive, a second layer is a plastic film carrier, and a third layer is a release layer and further comprising the step of applying a controlled pressure as the multilayered foil is brought into contact with the muntin bar member to cause the adhesive layer to bond to the muntin bar memeber.

13. The process of claim 12 additionally including applying heat to a region of contact between the covering material and the muntin bar material.

14. The process of claim 13 wherein one entire side of the elongated muntin bar material is painted and after bending of the muntin bar material into an elongated muntin bar member, one half of said painted surface is covered with the elongated strip of covering material to form a two tone muntin bar member which is cut into multiple muntin bars that form a grid.

* * * * *